No. 709,021. Patented Sept. 16, 1902.
H. DU B. LEFFERTS.
BICYCLE TIRE.
(Application filed Dec. 27, 1899.)
(No Model.)
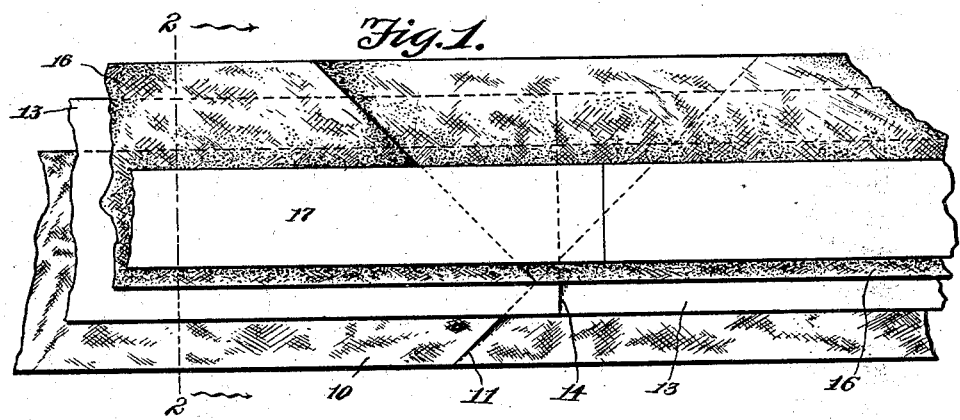
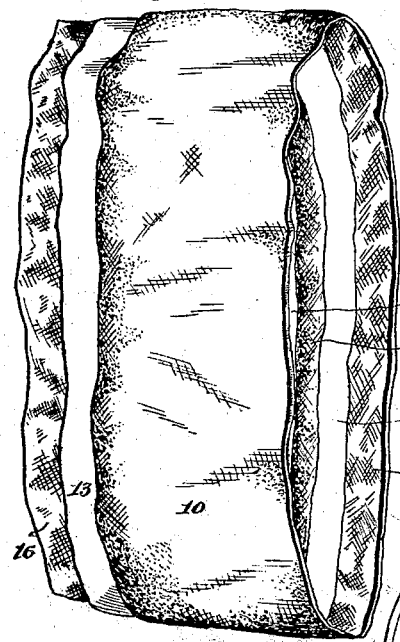
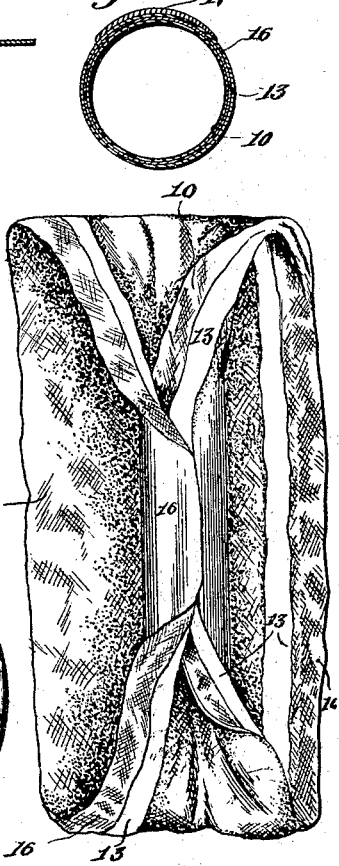
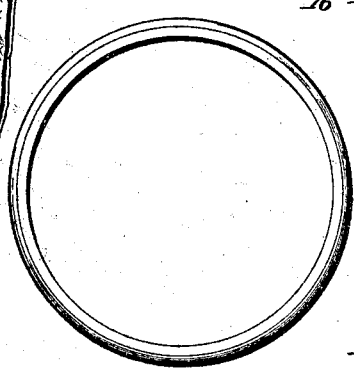
Witnesses
Henry DuB. Lefferts, Inventor
By his Attorneys,

UNITED STATES PATENT OFFICE.

HENRY DU BOIS LEFFERTS, OF NEW BRUNSWICK, NEW JERSEY.

BICYCLE-TIRE.

SPECIFICATION forming part of Letters Patent No. 709,021, dated September 16, 1902.

Application filed December 27, 1899. Serial No. 741,744. (No model.)

*To all whom it may concern:*

Be it known that I, HENRY DU BOIS LEFFERTS, a citizen of the United States, residing at New Brunswick, in the county of Middlesex and State of New Jersey, have invented a new and useful Bicycle-Tire, of which the following is a specification.

This invention relates to vehicle-tires, and more particularly to the class of pneumatic tires including a tube of combined layers of fabric and elastic material; and the object of the invention is to provide a tire and a method of making it which will result in a most efficient article, further objects and advantages of the invention being understood from the following description.

In the drawings forming a portion of this specification, and in which similar numerals of reference designate like and corresponding parts in the several views, Figure 1 is a plan view showing a portion of the inner surface of the belt from which the tire is formed and illustrating the overlapping arrangement of the several strips or layers. Fig. 2 is a section on line 2 2 of Fig. 1. Fig. 3 is a perspective view showing the belt in its completed form. Fig. 4 illustrates the method of joining the edges of the endless belt to form the endless tube with the tread on the inner side. Fig. 5 is a side elevation of a complete tire after it has been reversed to bring the tread upon the outer periphery.

Referring now to the drawings, in constructing a tire in accordance with the present invention a strip 10 of suitable strengthening material, which is preferably in the form of fabric, is treated with a solution of the raw rubber and the pores of the fabric are completely filled, the ends of this strip 10 being cut slantingly or on a bias, as shown at 11 and 12. The rubber in question is what is known in the art as "raw rubber," and consists of crude rubber having mixed therewith a number of modifying ingredients. In the present instance the raw rubber compound consists of medium Para rubber, fossil flour, litharge, zinc, paraffin, rubber substitute, and rape-oil. A second strip 13, somewhat longer than the strip 10, is then formed of a higher grade of rubber, including sulfur and litharge as modifying ingredients, this strip being somewhat narrower than the strip 10, as shown, and the ends of the rubber strip 13 are cut straight, as shown at 14, the rubber strip being secured temporarily to the first strip 10 by rubber-cement and being pressed firmly in position thereon to exclude all air bubbles. A third strip 16 of a strengthening fabric is then saturated with the same raw rubber compound and in the same manner as the first strip, this third strip being somewhat longer than the rubber strip and having substantially the same width. The third strip is mounted upon the rubber strip, and upon reference to Fig. 1 of the drawings it will be seen that in this arrangement of the strips the rubber strip projects slightly beyond one edge of the first strip at one side thereof, while its opposite side lies inwardly of the other edge of the first strip; also, the third strip at one side projects beyond the projecting edge of the rubber strip, while the opposite edge of the third strip lies inwardly of the inwardly-lying edge of the rubber strip, the result being what is known as a "shingled" arrangement. After the three strips have been thus secured together a rubber tread-strip 17 is fixed in the same manner upon the outer surface of the third strip, as shown, and in a position to form the tread of the complete tire. Beginning with the innermost strip 10, the bias ends thereof are lapped and rolled to temporarily hold them united. The ends of the rubber strip are then lapped and rolled, the ends of the third strip are then lapped and rolled, and, finally, the ends of the tread-strip are lapped and rolled, the ends of the several strips breaking joints, as shown, in order to provide a firm connection, while, as illustrated the bias cuts of the ends of the strips are formed alternately in opposite directions. When the ends of the several strips have thus been joined, there is formed an endless belt, the strip 10 lying outermost and the tread-strip lying innermost. The side edges of the complete belt are then bent upwardly and inwardly and are overlapped, so that the side edges of each strip are brought into mutual engagement, with the result that the lines of joinder of the edges of the several strips are displaced one from another, so that a broken joint is secured with the well-known strength. After the edges have been thus engaged and temporarily secured by means of cement they are rolled to make smooth joints, and the complete endless tube thus formed is partially inflated. After the partial inflation of the tube it is operated upon by an air-roller, which further closes the joints and fits the tire for the final operation. The final operation is performed after the joints have been securely closed and after the tire has been further inflated, and this final operation consists in immersing the entire tire in water and in heating the water to a temperature no more than 212°. This heating of the tire in the aqueous bath has the effect of rendering the raw rubber plastic and causing it to run together, so that the rubber layer is firmly united and incorporated with the fabric layers at either side thereof, while the several joints are firmly secured. The tire is subjected to this aqueous bath at a temperature of practically 212°, for approximately after which it is removed and is ready for use after having been reversed to bring the tread-strip on the outer periphery.

With the above construction it will be seen that the access of the inclosed air to the inner layer of rubber is prevented, thus giving a much longer life to the tire owing to the prevention of granulation.

What is claimed is—

The method of making a bicycle-tire, which consists in assembling (1) a strip of strengthening material treated with a solution of raw rubber and having its ends cut on the bias, (2) a second strip of rubber longer and narrower than the first strip and temporarily cemented thereto and having its ends cut straight, (3) a third rubber-saturated strip of strengthening material longer than the second strip and of substantially the same width, the second strip projecting slightly beyond one edge of the first strip and lying within the opposite edge thereof, and the third strip being extended beyond one edge of the second strip and lying within the opposite edge thereof, and, (4) a tread-strip fixed to the third strip and of less width than the other three strips, then lapping and rolling successively the ends of the strengthening-strip, second strip, third strip, and tread-strip, the ends of the several strips breaking joints, then overlapping and cementing the edges of the strips, leaving the tread-strip disposed on the inside of the tire thus formed, then partially inflating the tire, then subjecting it to a bath of boiling water, and finally reversing the tire to bring the tread-strip on the outside, substantially as and for the purpose specified.

In testimony that I claim the foregoing as my own I have hereto affixed my signature in the presence of two witnesses.

HENRY DU BOIS LEFFERTS.

Witnesses:
  CORNELIUS B. MCCRELIS,
  ALFRED S. MARCH.